(12) United States Patent
Yu et al.

(10) Patent No.: US 8,569,703 B2
(45) Date of Patent: Oct. 29, 2013

(54) SYSTEM AND METHODS USING QUANTUM DOTS AS GENERAL DOSIMETERS

(75) Inventors: Kui Yu, Kanata (CA); Diana Wilkinson, Ottawa (CA); Chunsheng Li, Ottawa (CA); Robert Stodilka, London (CA); Jeff Carson, London (CA); Alex Thomas, London (CA); Frank Prato, London (CA); Terry Thompson, London (CA)

(73) Assignee: Multi-Magnetics Inc., London, Ontario (CA)

( * ) Notice: Subject to any disclaimer, the term of this patent is extended or adjusted under 35 U.S.C. 154(b) by 941 days.

(21) Appl. No.: 12/571,199

(22) Filed: Sep. 30, 2009

(65) Prior Publication Data

US 2010/0176308 A1 Jul. 15, 2010

Related U.S. Application Data

(60) Provisional application No. 61/144,867, filed on Jan. 15, 2009, provisional application No. 61/153,736, filed on Feb. 19, 2009.

(51) Int. Cl.
*G01T 1/20* (2006.01)

(52) U.S. Cl.
USPC .................................................... 250/361 R

(58) Field of Classification Search
USPC .................................................... 250/361 R
See application file for complete search history.

(56) References Cited

U.S. PATENT DOCUMENTS

| | | | | |
|---|---|---|---|---|
| 6,485,703 | B1 * | 11/2002 | Cote et al. | 424/9.1 |
| 7,538,329 | B2 * | 5/2009 | Chen et al. | 250/370.11 |
| 8,164,074 | B2 * | 4/2012 | Boyden et al. | 250/492.1 |
| 8,198,099 | B2 * | 6/2012 | Raymo et al. | 436/524 |

OTHER PUBLICATIONS

Dai et al., "Nanocrystal-Based Scintillators for Radiation Detection," Unattended Radiation Sensor Systems for Remote Applications, Tromboka (ed.), CP632, pp. 220-224 (2002) American Institute of Physics.
Letant and Wang, "Study of Porous Glass Doped with Quantum Dots or Laser Dyes Under Alpha Irradiation," Applied Physics Letters, 88, 103110-1-103110-3 (2006).
Withers et al., "Rapid Degradation CdSe/ZnS Colloidal Quantum Dots Exposed to Gamma Irradiation," Applied Physics Letters, 93, 173101-1-173101-3 (2008).

\* cited by examiner

*Primary Examiner* — Constantine Hannaher
*Assistant Examiner* — Mindy Vu
(74) *Attorney, Agent, or Firm* — Lewis Kohn & Fitzwilliam LLP; David M. Kohn; Kari Moyer-Henry

(57) ABSTRACT

The invention is the novel use of Quantum Dots (QDs) for radiation dosimetry and includes novel dosimetry devices, systems and methods. The devices, systems and methods have use in a variety of dosimetry applications such as personal, environmental and research. The system for detecting doses of ionizing radiation comprises; a matrix comprising a photoluminescent semiconductor nanocrystals; an illumination interface for exposing the matrix to non-ionizing radiation; a response characterization interface for measuring photoluminescence, scatter or the optical density of the matrix and identifying differences in the photoluminescence, scatter or optical density caused by exposure to ionizing radiation; and a readout interface to quantify the photoluminescence or optical density differences as doses of radiation.

31 Claims, 12 Drawing Sheets

SYSTEM AND METHODS USING QUANTUM DOTS AS GENERAL DOSIMETERS

FIELD OF THE INVENTION

The invention relates to the detection of ionizing radiation. More particularly, the invention is the novel use of Quantum Dots (QDs) for radiation dosimetry and includes novel dosimetry devices, systems and methods. The devices, systems and methods have use in a variety of dosimetry applications such as personal, environmental and research.

BACKGROUND OF THE INVENTION

Dosimetry generally refers to the measurement of a long term absorbed radiation dose, rather than a momentary radiation quantity or rate. A dosimetry device counts the total radiation dose over some time interval. Detection of the radiation is based on the interaction between the radiation and some material. This interaction can cause physical, chemical or biological changes depending on the nature of the material and the amount of the radiation energy absorbed into the material. There are a number of different dosimetry methods currently used such as thermoluminescent dosimeters, ionization-type radiation detectors, photographic film and radiochromic materials. Each of these methods are inconvenient because they are complicated and or time-consuming and subject to error.

A dosimetry device and method are provided in U.S. Pat. No. 5,637,876 wherein the radiation dose is calculated based on optical density, that is, changes in optical properties.

Quantum dots (QDs) have been developed having desirable properties offering advantages over traditional organic dyes for biomedical applications. In particular, their optical properties depend on their size which can be tailored to be larger or smaller as required. Other advantages are: wideband excitation, narrow-band emission (typically ⅓ of conventional fluorophores), high molar extinction coefficients, resistance to photobleaching, long fluorescence lifetimes and fluorescence intensities at least an order of magnitude better than the best organic dyes.

There is little known about the interaction of QDs with ionizing radiation. Dai et al (Unattended Radiation Sensor Systems for Remote Applications, Tromboka (ed.), CP632, pp. 220-224, [2002], American Instituted of Physics) report that semiconductor Quantum Dots (QDs) can be used as scintillators for detecting alpha particles. Letant and Wang (Nano Letters, 6, pp. 2877-2880, [2006]) and (Applied Physics Letters, 88, 103110 [2006]) report on the use of QDs for detecting gamma radiation. Withers et al (Applied Physics Letters, 93, 173101 [2008]) report the effects of gamma irradiation on photoluminescent properties of CdSe/ZnS QDs.

There remains a need to provide improved dosimetry method and device that can easily and accurately detect ionizing radiation in a variety of applications.

SUMMARY OF THE INVENTION

In accordance with the present invention there are provided novel methods, devices and systems using Quantum Dots (QDs) as dosimeters. QDs are now characterized in response to a range of doses of ionizing radiation allowing for their customizing to have specific responses to ionizing radiation. As such the QDs can be used for a variety of applications such as for personal dosimetry use in clinical hospital settings, environmental dosimetry and for research.

As used throughout the description herein, the broad term nanocrystals is used to denote Quantum Dots (QDs).

The nanocrystals of the invention are photoluminescent semiconductor nanocrystals that are characterized and selected for their ability to respond to ionizing radiation in a characterized manner. In aspects, the nanocrystals have a known optical absorption response in the optical density spectrum related to the absorbed ionizing radiation dose.

According to an aspect of the present invention there is provided a homogenous composition/ensemble of nanocrystals. Wherein homogeneity refers to uniformity or consistency in nanocrystal synthesis, size, composition, age, history of exposure to ionizing radiation, and expected/tailored response to ionizing radiation exposure. Here, homogeneous may also refer to an ensemble of nanocrystals each having a core/shell structure, which may be otherwise homogeneous in other aspects. In aspects of the invention, the composition/ensemble is heterogenous and comprises a mixture of two or more homogeneous ensembles of nanocrystals.

According to another aspect of the present invention is a homogeneous composition of nanocrystals comprising pre-characterized nanocrystals in a suitable matrix material. In aspects the combination of matrix and nanocrystals jointly contribute to the manner in which the nanocrystals respond to ionizing radiation.

According to another aspect of the present invention is a heterogeneous composition of nanocrystals comprising a mixture of different homogeneous ensembles of pre-characterized nanocrystals in a suitable matrix material. In aspects the combination of matrix and nanocrystals jointly contribute to the manner in which the nanocrystals respond to ionizing radiation.

According to another aspect of the present invention is a system for detecting doses of ionizing radiation, said system comprising;
- a matrix comprising a photoluminescent semiconductor nanocrystals;
- an illumination interface for exposing said matrix to non-ionizing radiation (light);
- a response characterization interface for measuring photoluminescence, scatter or the optical density of said matrix and identifying differences in said photoluminescence, scatter or optical density caused by exposure to ionizing radiation;
- and a readout interface to quantify said photoluminescence, scatter or optical density differences as doses of radiation.

In aspects of the method, the photoluminescent semiconductor nanocrystals are characterized to have a known photoluminescent or scatter response in the photoluminescent or scatter spectrum related to the absorbed ionizing radiation dose of the nanocrystals.

In further aspects the photoluminescent or scatter response includes a known increase or decrease in all, or any part, of the amplitude of the photoluminescent or scatter spectrum of the nanocrystals.

In still further aspects the photoluminescent or scatter response includes a known increase or decrease in any part of the amplitude of the photoluminescent or scatter spectrum relative to a different part of the photoluminescent or scatter spectrum of the nanocrystals.

In yet further aspects of the invention the photoluminescent or scatter response includes a known shift in the frequency of any part, including a shift of a spectral peak or a spectral trough, of the photoluminescent or scatter spectrum of the nanocrystals.

In further aspects of the invention the optical absorption response includes a known increase or decrease in all, or any part, of the amplitude of the optical density spectrum of the nanocrystals.

In still further aspects, the optical absorption response includes a known increase or decrease in any part of the amplitude of the optical density spectrum relative to a different part of the optical density spectrum of the nanocrystals.

In yet further aspects, the optical absorption response includes a known shift in the frequency of any part, including a shift of a spectral peak or a spectral trough, of the optical density spectrum of the nanocrystals.

According to another aspect of the present invention is a system for detecting doses of ionizing radiation, said system comprising;
  photoluminescent semiconductor nanocrystals (mention matrix here?);
  an illumination interface for exposing said nanocrystals to non-ionizing radiation;
  a response characterization interface for measuring photoluminescence, scatter or the optical density of said matrix and identifying differences in said photoluminescence, scatter or optical density caused by exposure to ionizing radiation; and
  a readout interface to quantify said photoluminescence, scatter or optical density differences as doses of radiation.

According to another aspect of the present invention is a method for detection and/or quantification of ionizing radiation dosages, said method comprising;
  exposing photoluminescent semiconductor nanocrystals to non-ionizing radiation (light) to provide a baseline scatter measurement;
  exposing said nanocrystals to ionizing radiation where the total exposure is the dose;
  exposing again said nanocrystals to non-ionizing radiation (light) such that a different scatter is produced;
  comparing the different scatter to said baseline scatter measurement; and
  interpreting the difference as dose.

According to another aspect of the present invention is a method for detection and/or quantification of ionizing radiation dosages, said method comprising;
  exposing photoluminescent semiconductor nanocrystals to non-ionizing radiation (light) to provide a baseline scatter measurement;
  exposing said nanocrystals to ionizing radiation where the total exposure is the dose;
  exposing again said nanocrystals to non-ionizing radiation (light) such that a different scatter is produced;
  comparing new scatter to said baseline scatter measurement;
  interpreting the difference as dose; and
  displaying the dose to a user.

In aspects of the methods, there is a known temporal evolution of the photoluminescent or scatter response or the optical absorption response related to the amount of time elapsed after the termination of the ionizing radiation exposure of the nanocrystals.

In aspects of the methods, there is a temporal evolution of the photoluminescent or scatter response or the optical absorption response towards the baseline (pre-exposure) response where baseline is taken to be the response prior to ionizing radiation exposure.

In methods of the invention the nanocrystals are exposed to light for the purpose of determining from the nanocrystals their photoluminescent or scatter response or optical absorption response or both, prior to those nanocrystals being exposed to ionizing radiation, and wherein said response or responses are considered a baseline (pre-exposure) response;

In methods of the invention the nanocrystals, with their baseline responses having been characterized, are exposed to ionizing radiation, and the change in their responses from baseline as a result of the exposure to ionizing radiation are characterized during the exposure by a response characterization device.

In methods of the invention, the nanocrystals, with their baseline responses having been characterized, are exposed to ionizing radiation, and the change in their responses from baseline as a result of the exposure to ionizing radiation are characterized after the exposure by a response characterization device.

According to another aspect of the present invention is a response dosimetry device comprising photoluminescent nanocrystals, said device comprising;
  an illumination interface facilitating ambient light or a light source to stimulate said nanocrystals into photoluminescent emission; and
  a readout interface to measure a photoluminescent response to determine the dose of ionizing radiation received by said nanocrystals.

In aspects, the device relies upon an illumination interface facilitating ambient light or including a light source to stimulate the nanocrystals into photoluminescent emission and also includes a readout interface to measure the photoluminescent response for the purpose of determining the amount of time elapsed after the termination of the ionizing radiation exposure of said nanocrystals.

In aspects of the invention the devices rely upon an illumination interface facilitating ambient light or including a light source to transmit light through the nanocrystals, and also includes a readout interface to measure the optical absorption response for the purpose of determining the dose of ionizing radiation receive by said nanocrystals.

In further aspects of the invention the device relies upon an illumination interface facilitating ambient light or including a light source to transmit light through said nanocrystals, and also includes a readout interface to measure the optical absorption response for the purpose of determining the amount of time elapsed after the termination of the ionizing radiation exposure of said nanocrystals.

In aspects of the invention, the readout interface provides an electronic signal that can be interpreted by a human observer in a qualitative or quantitative manner as ionizing radiation dose.

According to another aspect of the present invention is a response dosimetry device comprising photoluminescent nanocrystals, said device comprising;
  an illumination interface facilitating ambient light or a light source to stimulate said nanocrystals into photoluminescent emission;
  a readout interface to measure a photoluminescent response to determine the dose of ionizing radiation received by said nanocrystals; and
  an electronic signal providing qualitative and/or quantitative radiation dose.

According to yet another aspect of the present invention, there is provided a radiation dosimeter, comprising:
  a substrate;
  a layer of QDs on said substrate, said QDs having a characterized photolumiscent, scatter, or optical density response which varies in accordance with a degree of radiation exposure of said QDs;

a response characterization interface for measuring photoluminescence or scatter or optical density of said QDs for identifying differences in said photoluminescence, scatter or optical density caused by exposure to ionizing radiation; and a readout interface disposed on said substrate for identifying said differences as dose.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from said detailed description.

BRIEF DESCRIPTION OF THE DRAWINGS

The present invention will become more fully understood from the detailed description given herein and from the accompanying drawings, which are given by way of illustration only and do not limit the intended scope of the invention.

DETAILED DESCRIPTION OF THE EMBODIMENTS

Figure 1:
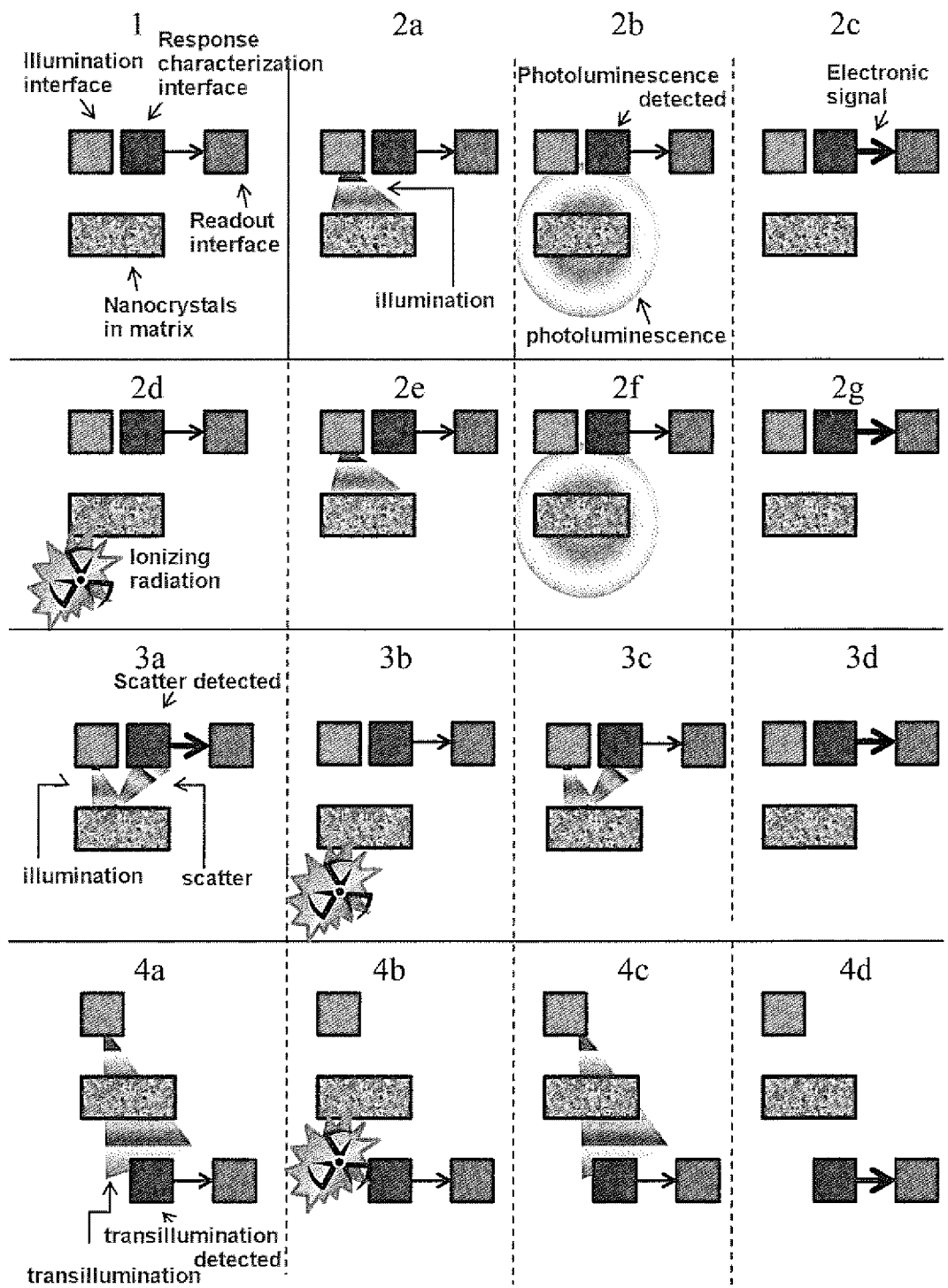
FIG. 1: The figure shows schematic drawings of an embodiment of the present invention ("1"), and the configuration used to determine ionizing radiation dose using photoluminescence measurements ("2a" to "2g"), scatter measurments ("3a" to "3d"), and transillumination measurments ("4a" to "4d").

The Applicants have now demonstrated that semiconductor photoluminescent nanocrystals, herein referred to as Quantum Dots (QDs) can be characterized and 'tuned' to have different sensitivities to ionizing radiation, where for example the dynamic range for some QDs ensembles is more suitable to human dosimetry for radiation safety monitoring purposes, and other QDs ensembles are more suited to industrial device dosimetry. The nanocrystals can also be tuned to feature temporal evolution of their photoluminescent or optical absorption properties after the exposure to ionizing radiation has been terminated. In the case of nanocrystals designed to recover to their pre-exposure response, the nanocrystals may be suitable for repeated use; whereas in the case of a non-changing response, the nanocrystals may form part of a permanent record of dose.

The nanocrystals (QDs) of the invention can be used in methods, devices and systems to quantify doses of ionizing radiation in a wide variety of materials, environments and also for human use in clinical settings. The devices are dosimetry devices such as radiation badges for human use to determine any and amounts of ionizing radiation exposure. The device of the invention measures changes to the photoluminescence, scatter or optical absorption properties of the nanocrystals (QDs) and interprets those changes as being due to ionizing radiation exposure. The response characterization device relies upon a light source, either being ambient light or a light source intrinsic to the device, and a detector to measure the changes in photoluminescence, scatter or optical density.

The methods, devices and systems of the invention utilize Quantum dots that are semiconductor nanocrystals capable of at least one of absorption and luminescence when excited by a source of energy. Exemplary sources of energy include ionizing radiation (i.e. for applications in which the QD is used as a scintillant) and non-ionizing radiation, and may also further include electrical energy sources and sources of electromagnetic energy, for example, lasers and light emitting diodes. Suitable semiconductor nanocrystals include but are not limited to MgS, MgSe, MgTe, CaS, CaSe, CaTe, SrS, SrSe, SrTe, BaS, BaSe, BaTe, ZnS, ZnSe, ZnTe, CdS, CdSe, CdTe, HgS, HgSe, HgTe, GaAs, InGaAs, InP, PbSe, PbS, InAs, and combinations thereof. Various alloys including one or more of these materials are also embodied. In aspects the nanocrystals are selected from CdS, ZnSe, CdTe, InP, HgS and InAs.

The quantum dots may be prepared using known techniques, such as those discussed in U.S. Pat. Nos. 5,505,928, 5,262,357, and 5,751,018 and the articles Cao and Banin, J. Am. Chem. Soc., 122, 9629 9702 (2000) and Murray, Kagan, and Bawendi, Ann. Rev. Mater Sci., 30, 545 610 (2000). Each of these patents and articles is incorporated herein by reference in their entirety.

Quantum dots for use in the present invention may have an absorption spectrum within the visible wavelengths, the infrared (IR) wavelengths, the near-infrared (NIR) wavelengths, or some combination thereof. In addition to, or as an alternative to, having an absorption spectrum within these wavelength ranges, quantum dots useful in the invention may luminesce within the visible wavelengths, the IR wavelengths, the NIR wavelengths, or some combination thereof. In one embodiment, the quantum dots have a luminescence spectrum including at least one maximum within the IR and/or NIR wavelengths, for example from about 800 nm to about 2000 nm, from about 1200 nm to about 1700 nm, or from about 1300 nm to about 1550 nm. Luminescence may be photoluminescence.

Quantum dots suitable for use in the present invention may have a core/shell configuration wherein the quantum dot comprises a semiconductor core and at least one shell comprising another, preferably semiconductor, material overlying the core. An exemplary shell comprises ZnS. Core diameters may range from about 20ANG. to about 100 .ANG or about 2 to 5 nm in diameter. In some embodiments where the quantum dots have a core/shell morphology, the core of the quantum dot may have a thickness/diameter of less than about 15 nm, preferably less than about 10 nm, for example from about 2 nm to about 9 nm, from about 2 nm to about 5 nm, or from about 4 nm to about 8.5 nm. Preferred shell thicknesses range from about 1 atomic monolayer to about 25 .ANG. In some embodiments where the quantum dots have a core/shell morphology, the shell of the quantum dot may have a radial thickness of less than about 5 nm, preferably less than about 3 nm, for example from about 0.25 nm to about 2.5 nm. In other embodiments where the core of the quantum dot does not have a shell layer disposed therearound, the quantum dot may have an average diameter (of less than about 15 nm, preferably less than about 10 nm, for example from about 2 nm to about 9 nm).

The shell layer may comprise materials possessing a semiconductor band gap greater than that of the core material, while preferably also having essentially no effect on the optical properties, for example, the wavelengths of peak absorbance and/or emission of the core material. More than one shell layer may be provided. For example, it is possible to provide several layers of a shell layer each of a thickness of up to about 0.3 nm. A preferred intermediate shell material operates as a chemical and/or physical bridge between the core material and the outer shell. In the case of mismatched crystalline lattice dimensions, the intermediate shell may eliminate or minimize lattice strain associated with the transition between mismatched crystalline lattices of the core material 16 and shell material. Thus, for example, an InAs core may be provided with a CdSe first shell and a ZnS outer shell. In one embodiment, the coating material of the shell comprises zinc sulfide, cadmium selenide, an alloy comprising at least one of these materials, or combination thereof. In another preferred embodiment, the coating material of the shell comprises a single compound/alloy material such as zinc sulfide or zinc selenide.

The invention is represented by schematics shown in FIG. 1 that illustrate several non-limiting embodiments of the invention. FIG. 1, Schematic 1 illustrates one embodiment of the invention which comprises an illumination interface, a response characterization interface, a readout interface, and nanocrystals in a matrix. The response characterization interface is positioned to measure photoluminescent emission from the nanocrystals. Schematics 2a through 2c illustrate the process of obtaining baseline measurements of the photoluminescent characteristics of the nanocrystals. In Schematic 2a, the nanocrystals are illuminated with non-ionization radiation, stimulating them to emit photoluminescence as shown in Schematic 2b. Here, the term "non-ionization radiation" may be interchanged with "light", as would be understood by one skilled in the art. This photoluminescence is then detected by the response characterization device, and converted into a signal (2e) that is interpreted as the baseline measurement by the readout interface. In Schematic 2d, the nanocrystals are exposed to ionizing radiation, which can change their photoluminescence properties. To detect or quantify that dose of ionizing radiation, the nanocrystals are illuminated with non-ionization radiation (2e), again causing them to emit photoluminescence again detected by the response characterization device (2f) but this time the photoluminescence emissions are different then the baseline emissions. These new photoluminescence measurements are provided to the readout interface (2g) that compares the new measurements with the baseline measurements and interprets the difference as a dose. This dose can then be displayed to the user.

A further non-limiting embodiment of the invention for detection of ionizing radiation using scatter is shown in Schematics 3a-d. As with the embodiment relying upon photoluminescence, a baseline scatter measurement is obtained prior to exposure to ionizing radiation. Obtaining this baseline scatter measurement is illustrated in Schematic 3a, where the nanocrystals are illuminated with light and the scattered light is measured by the response characterization device. Schematic 3b illustrates the nanocrystals being exposed to ionizing radiation. To detect or quantify that dose of ionizing radiation, the nanocrystals are illuminated (3c), and the light scattered from the nanocrystals is measured by the response characterization device but this time the scatter is different than the baseline scatter. These new scatter measurements are provided to the readout interface (3d) that compares the new measurements with the baseline measurements and interprets the difference as a dose, which can then be displayed to the user.

Schematics 4a-d illustrate a further non-limiting embodiment of the invention that relies upon changes to the optical density of the nanocrystals following exposure to ionizing radiation. In this embodiment, Schematic 4a shows the response characterization device positioned such that it can detect transillumination of the nanocrystals by the illumination interface and thus measure optical density. As with the embodiment relying upon photoluminescence, a baseline optical density is measured prior to exposure to ionizing radiation (4a). Here, the term "transillumination" may be interpreted to mean "optical transmission", as would be understood by one skilled in the art. Schematic 4b illustrates the nanocrystals being exposed to ionizing radiation, which can change their optical density. Subsequently, the nanocrystals are transilluminated by the illumination interface, and their optical density measured (4c), which is provided to the readout interface (4d). The readout interface then interprets differences in the optical density from baseline as dose, which is then provided to the user as a display.

The invention allows so-called "stand-off" detection of ionizing radiation, wherein the presence of ionizing radiation can be detected without the user being in the radiation field. This is very desirable since it substantially reduces risk to the user. One embodiment for using the invention for stand-off detection would involve first placing the nanocrystals in the radiation field. This could be done by first embedding the nanocrystals into a transparent gel or liquid matrix and then spraying that gel onto one or more surfaces in the radiation field. The nanocrystals would then be exposed to the ioniziation radiation while positioned within this field. Subsequently, the nanocrystals could be illuminated from a distance by non-ionizing radiation such as a laser or flash situated outside of the radiation field. Similarly, photoluminescence could be detected from a distance using an optical detector or even a camera to remotely "photograph" the photoluminescence from outside the field.

The invention encompasses the creation of rigid plates, flexible films, fibers, and gels, liquids and aerosols comprised of the QDs of the invention embedded in a suitable matrix for the purposes of radiation detection. Rigid plates may be mounted onto solid surfaces, such as vehicles or buildings, flexible films and fibers may be woven into clothing, gels and liquids can be made into paints and skin tattoos, and aerosols may be dispersed into the atmosphere. Illumination and photoluminescence or transillumination detection may be accomplished with a device permanently or temporarily mounted onto or near the matrix; or at a distance for stand-off detection.

The invention comprises the use of ambient light as a source of illumination. This includes, for example, ordinary room lighting inside and sunlight outside.

The invention comprises both real-time and delayed-time radiation detection. In the case of real-time, the nanocrystals (QDs) may be interrogated by illumination repeatedly over the duration of radiation exposure, and their changes resulting from radiation exposure monitored continuously. In the case of delayed-time detection, the nanocrystals are exposed to radiation over the duration of interest, and then interrogated by illumination at one or more later times. If the nanocrystals are selected so as to exhibit a time-dependent response to exposure to ionizing radiation, the photoluminescence or other properties measured during these interrogrations may be used to determine the amount of time elapsed after the exposure of nanocrystals to the ionizing radiation.

The invention encompasses the simultaneous use of multiple types of nanocrystals, where characteristics of interest the radiation field may be discerned by examining the differential response from the different types of nanocrystals, since the response to radiation depends on the specific type of nanocrystal. Examples of characteristics of interest of the radiation field include total dose, dose rate, time between dose and readout, quality (x-rays, protons, neutrons), energy, and duration of exposure.

The invention also embodies the use of nanocrystals for internal dosimetry. Applications here include detecting radioactive material inside the body or monitoring external exposure from within the body. The nanocrystals are embedded into a gel or capsule which is then introduced into the body. For example a capsule containing nanocrystals is swallowed and then retrieved after passing through the alimentary canal. In another example, the nanocrystal gel or capsule is introduced into the circulatory system or embedded into tissue. In the former case, the blood could subsequently be passed through an external filtration system, similar to a dialysis unit, but equipped with an illumination source and response characterization interface. In the latter example, the nanocrystals could be retrieved through an incision for analysis or read out in-situ using optical spectroscopy and/or imaging methods if within approximately 1 cm of the skin surface. These applications may have utility in monitoring radiation exposure in radiation therapy for cancer treatment.

The invention also embodies performing dosimetry on a cellular scale. For example, many questions concerning cellular dosimetry remain unanswered due to the inability to experimentally determine radiation dose inside the cell. Instead, research presently relies upon computer simulations to calculate dose inside cells. It is known that cells can be labeled with quantum dots (i.e. nanocrystals), either on the cell surface or inside the cell. In the invention disclosed herein, the matrix as shown in FIG. 1 comprises cells. Nanocrystals inside the cells (i.e. the matrix) would then be illuminated by the illumination interface, and photoluminescence would be used to yield a baseline measurement. Then, ionizing radiation could be introduced either from radionuclides (or any other source) outside the matrix, or from radionuclides inserted into the matrix. In this latter arrangement, the radionuclides could be inserted into the cells of the matrix themselves, or they could be inserted into the matrix with the cells. Dose would then be imparted to the nanocrystals, changing their photoluminescence characteristics. This would allow calculation of the dose received inside the cells of the matrix. Additionally, the nanocrystals could be conjugated with antibodies that target specific organdies inside the cell, causing those nanocrystals to preferentially adhere to those organelles. An example of a document disclosing the principle of attaching antibodies to quantum dots is U.S. Provisional Patent Application No. 61/105,484 to Yu, filed Oct. 15, 2008, the contents of which are incorporated herein by reference. The nanocrystals could also be so conjugated so as to preferentially adhere to the outside of the cell. The nanocrystals could also be conjugated with nucleotides that become incorporated into the DNA of the cell. By utilizing such nanocrystal-organelle complexes (e.g. nanocrystal—antibody or nucleotide complexes), the dose specific to selected structures inside the cell can be determined. Additionally, the antibodies, nucleotides, or nanocrystals may themselves be labeled with radioactivity, which can provide additional information for the study of cellular damage and repair mechanisms.

The invention also embodies the concept of quantum dots (i.e. nanocrystals) that are designed to be radiation sensitive, or to have a desired radiation sensitivity profile, and to be modified to be water soluble. An example of this is the Cucurbituril (CB)-modified water-soluble nanocrystals, which is sensitive to low dose radiation. The quality of being water-soluble renders CB-modified nanocrystals especially suitable to biological applications, such as for cellular dosimetry, for example.

The invention also embodies the spatial arrangement of nanocrystals into patterns to simplify readout. For example, nanocrystals are layered/arranged into superimposed layers where each layer contains a specific arrangement of nanocrystals, and different layers contain different type of nanocrystals with specific response profiles. After radiation exposure, interpretation of dose could be simplified by examining both spectroscopic information as well as spatial information. This may aid in detection of exposure with the un-aided eye.

The invention embodies the detection of a change in the optical properties of nanocrystals by any means, which could include the un-aided eye. In this case, optical filters could be placed adjacent to the nanocrystals preferentially admitting or attenuating certain frequencies of photoluminescent or transilluminated light.

The invention also embodies the use of a matrix designed to facilitate or enhance the detection of ionizing radiation by the nanocrystals. Such a matrix may, for example, be a medium that interacts with short-range alpha particles and emits bremstahhlung radiation (breaking x-rays). These x-rays may be detected more easily by the nanocrystals. In this embodiment, the nanocrystals may be suspended in the matrix, or may be placed near or at some distance from the medium. The matrix plays a role in facilitating the detection of the radiation. This embodiment may have utility in stand-off detection.

The above disclosure generally describes the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

Example 1

Photoluminescent Peak Amplitude

The following example demonstrates changes in QD photoluminescence as a result of exposure to ionizing radiation. The QDs in this example are most sensitive to changes between 1.0 and 100 Gy. The aspect of response that is considered here is a decrease in amplitude of a peak in the photoluminescence spectrum.

Figure 2:
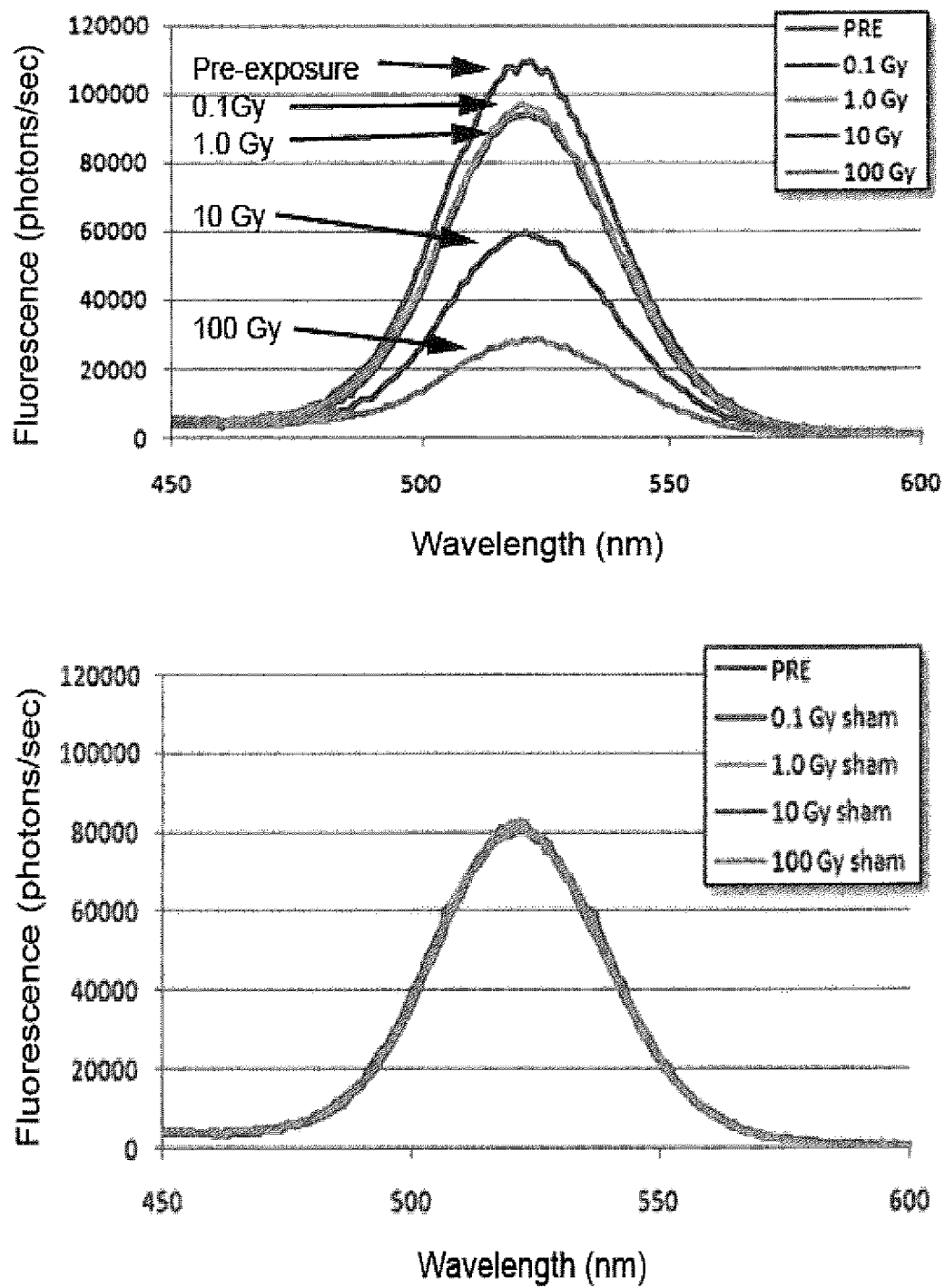
FIG. 2: (Left) The plot shows fluorescent spectra before irradiation (0 Gy), and following exposures to 0.1 Gy, 1.0 Gy, 10 Gy, and 100 Gy. A decrease in peak amplitude is observed with exposure. (Right) Spectra from a control sample (0 Gy) did not change appreciably during the experiment.

Quantum Dots CdSe/ZnS QDs were prepared according to Aldana et al [2001], Yu et al [2005] and Jakubek et al [2008], comprised of a 2-nm diameter CdSe core, with three 0.3-nm thick ZnS monolayer coatings (total QD diameter ~4 nm), with a 524 nm fluorescence peak. For the irradiation experiment, 6 samples were prepared from this ensemble, each comprised of 0.300 g of as-prepared QDs suspended in 30 ml hexane. Each sample was contained in a sealed quartz cuvette with a 1-cm pathlength. Three samples were prepared for irradiation, and 3 reserved as unexposed controls. Irradiation: QDs were irradiated with a Co-60 teletherapy source (1.17 and 1.33 MeV gamma radiation) at 4.29 Gy/min. Samples were irradiated incrementally to total doses of 0.1, 1.0, and 100Gy. Spectroscopy: <1 min after each irradiation, all samples were interrogated by fluorescence spectroscopy (excitation at 380 nm by a xenon arc lamp; fluorescence measured from 450 to 600 nm by a scanning monochrometer coupled to a photomultiplier tube). Results shown in FIG. 2.

Example 2

Photoluminescent Peak Position

The following example demonstrates changes in QD photoluminescence as a result of exposure to ionizing radiation. The QDs are most sensitive to changes between 1.0 and 10 Gy. The aspect of response that is considered here is a shift in a peak in the photoluminescent spectrum, following a decomposition of the peak into 3 components.

Figure 3:
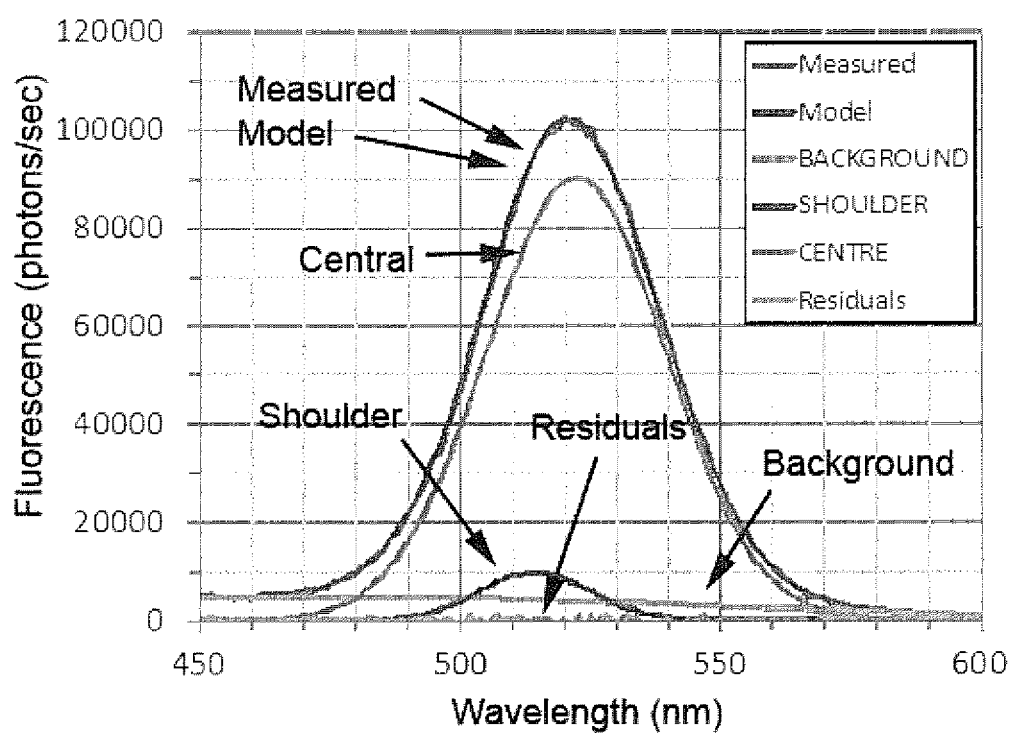
FIG. 3: Example of a fluorescence spectrum from a QD control sample fit with a three component Gaussian model. The components of the model were specified as CENTRE to indicate the main fluorescence peak, SHOULDER to indicate a smaller fluorescence peak that was blue shifted compared to CENTRE, and BACKGROUND to indicate background fluorescence (and scatter) signal. Residuals indicated the wavelength dependant difference between the measured fluorescence spectrum and the model spectrum resulting from the addition of the three components.
Figure 4:
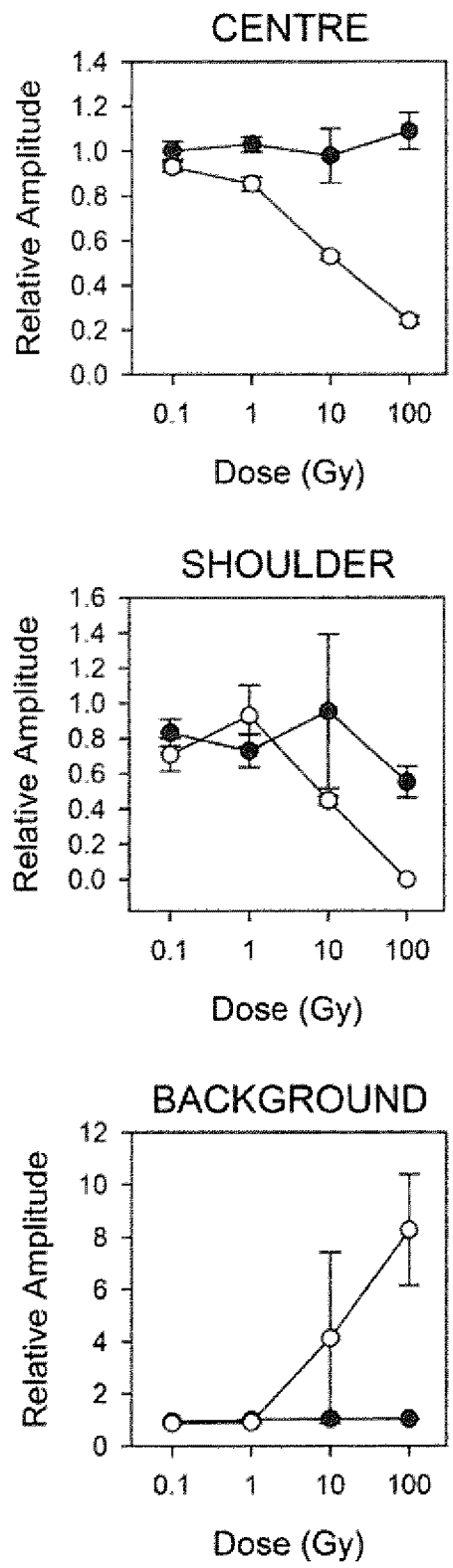
FIG. 4: Summary results from the 3 component data analysis procedure. Each graph represents the relative change in the fit parameter (indicated on the y-axis) as a function of radiation dose (in Gy, x-axis). Symbols with error represent the sample mean±s.e.m. Open symbols represent the radiation-treated samples. Closed symbols represent the control samples. Data were grouped by component in the model fit function, i.e. CENTRE to indicate the main fluorescence peak, SHOULDER to indicate a smaller fluorescence peak that was blue-shifted compared to CENTRE, and BACKGROUND to indicate background fluorescence (and scatter) signal. Baseline measurement for Gaussian amplitude (left column), Gaussian position (middle column) and Gaussian width (right column), as a function of dose. Open symbols represent the mean for three measurements for exposed samples; closed symbols represent controls. Error bars represent standard-error-of-the-mean across three samples. For the CENTRE Gaussian (top row): the amplitude was found to decrease, but relatively little change was noted in position or width. For the BACKGROUND Gaussian (bottom row): amplitude, position and width were all found to be affected by radiation exposure. The effect on the SHOULDER Gaussian (not shown) was similar to the CENTRE Gaussian, but changes were less pronounced.
Figure 4:
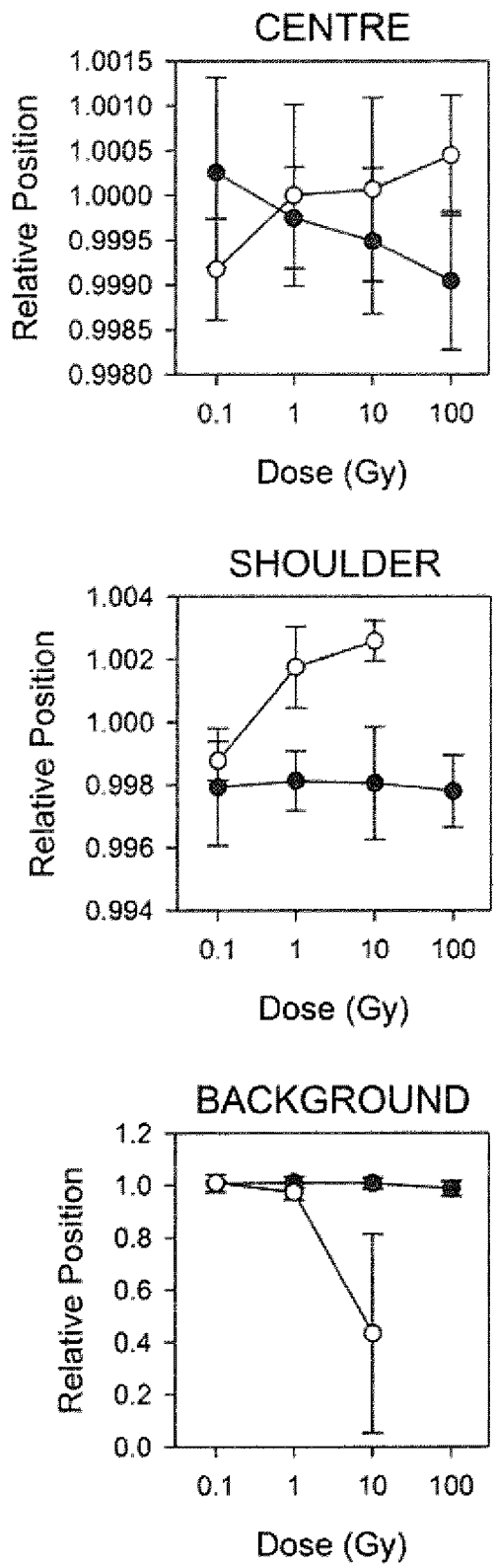
Figure 4:
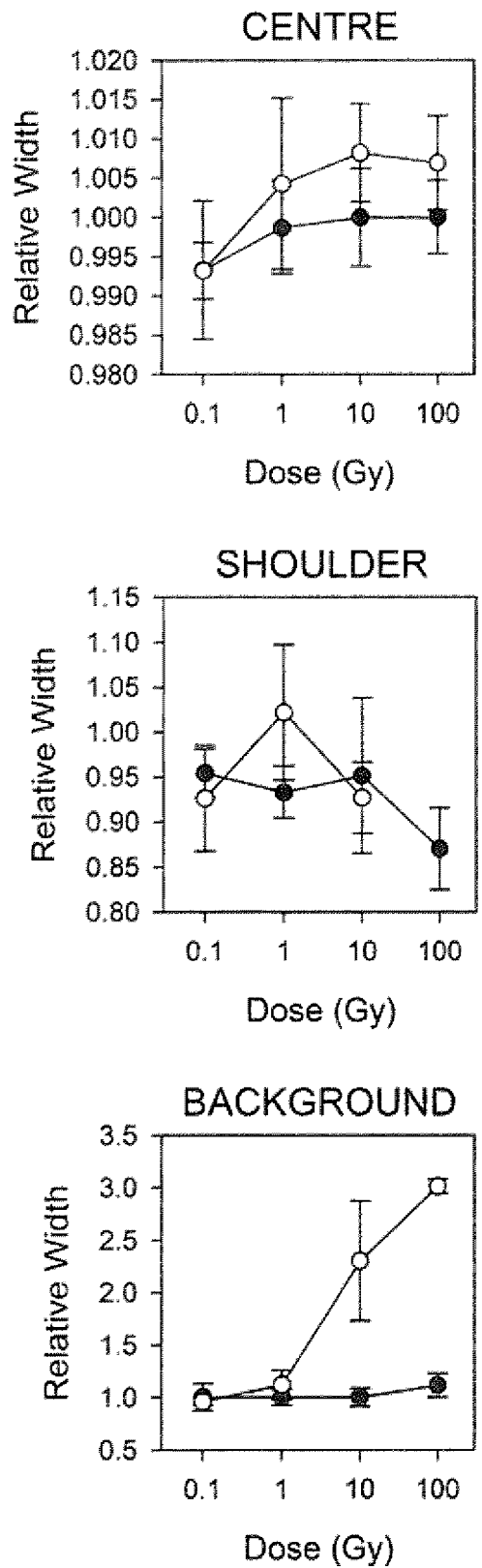

Preparation of QDs and irradiation was identical to Example 1. Spectroscopy: <1 min after each irradiation, all samples were interrogated by fluorescence spectroscopy (excitation at 380 nm by a xenon arc lamp; fluorescence measured from 450 to 600 nm by a scanning monochrometer coupled to a photomultiplier tube), and emission spectra fit to a 3-component mixed Gaussian model. Results shown in FIGS. 3 and 4.

In photoluminescent spectroscopic analysis, amplitude measurements (presented in Example 1) are dependent upon the signal strength, and hence the concentration of QDs in solution. Changes in peak position, however, are independent of signal strength—making the observed changes in the BACKGROUND Gaussian position a very useful parameter to identify radiation dose in the 1.0-100 Gy gamma-radiation range.

Example 3

Tuning Nanocrystals to Different Sensitivities of Ionizing Radiation

Figure 5:
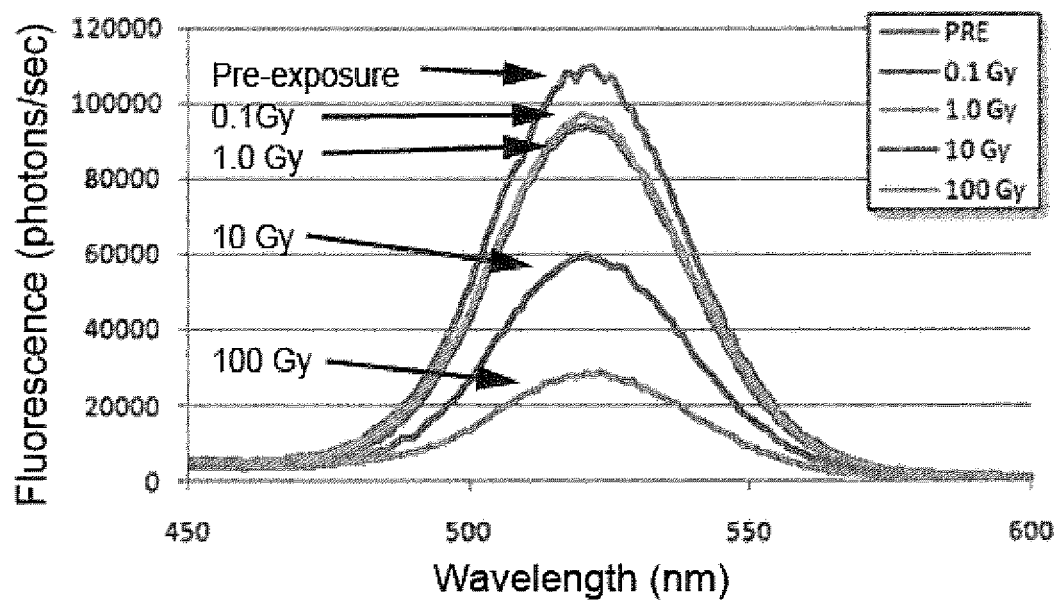
FIG. 5: Left: The plot shows fluorescence spectra of regular CdSe/ZnS QDs before irradiation (0 Gy), and following exposures to 0.1 Gy, 1.0 Gy, 10 Gy, and 100 Gy. A decrease in peak amplitude is observed with exposure. The change between 0 and 1.0 Gy is minimal; however, the change between 1.0 Gy and 100 Gy is more pronounced. (Right) The right plot shows fluorescent spectra of Magic Sized QDs before irradiation, and following exposure to 0.1Gy and 0.5Gy. In this case, the change in amplitude is considerable between 0 Gy and 0.5 Gy; and there is a smaller change between 0.1 Gy and 0.5 Gy. This suggests these Magic Sized QDs are particularly sensitive to changes between 0 and 0.1 Gy.
Figure 5:
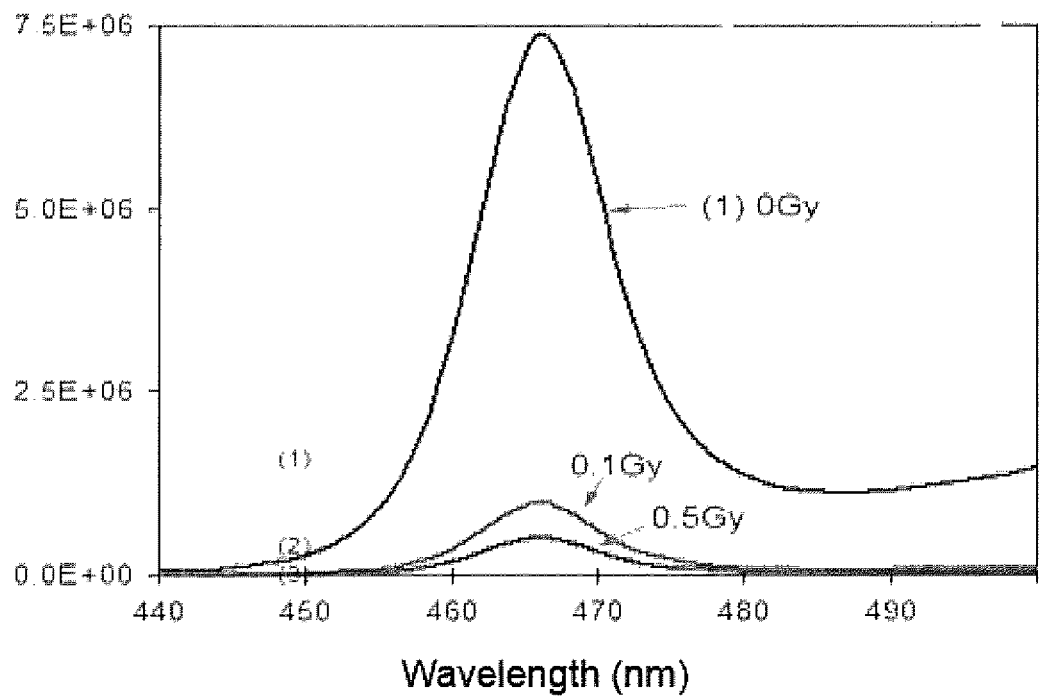

This example demonstrates changes in QD photoluminescence as a result of exposure to ionizing radiation, and demonstrates that QDs can be tuned to have different sensitivities. Two ensembles of QDs are compared. The first ensemble, tuned for sensitivity between 1.0 and 100 Gy, was comprised of regular quantum dots with a CsSe core and ZnS shell. The second ensemble, tuned for sensitivity between 0 and 0.5 Gy was comprised to CdSe Magic Sized QDs[1]. Results shown in FIG. 5.

Example 4

Optical Density

Figure 6:
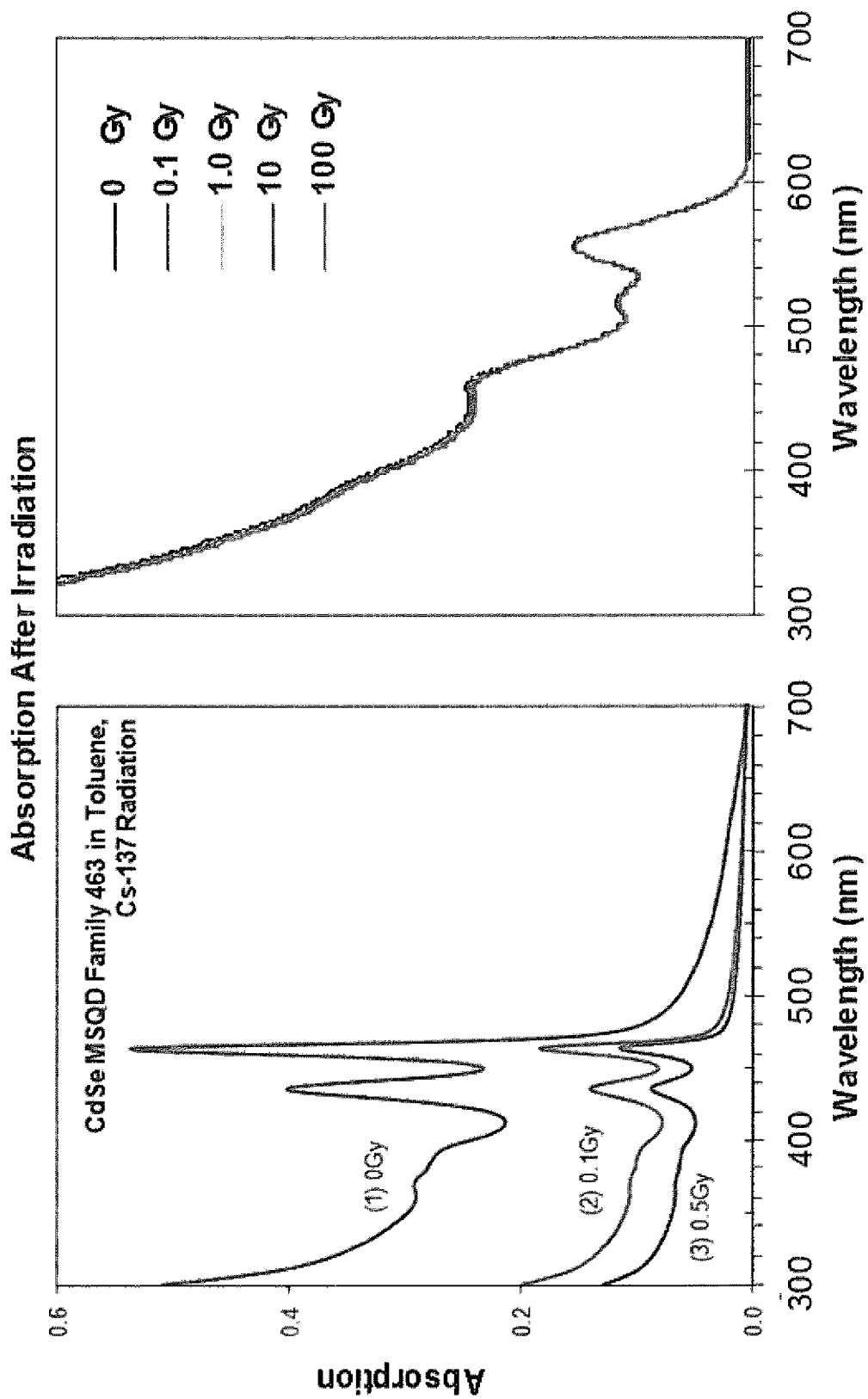
FIG. 6: Left: the plot shows that Magic Sized QDs undergo a reduction in absorption following a dose of 0.1 Gy. Right: Regular CdSe QDs exhibited negligible change in the absorption spectrum before and after irradiation (up to 100 Gy), in terms of the optical density and the peak position.

This example demonstrates changes in QD optical density as a result of exposure to ionizing radiation, and demonstrates that QDs can be tuned to have different response in optical density. Two ensembles of QDs are compared. The first ensemble, tuned to change optical density as a result of ionizing radiation, was comprised of Magic Sized QDs. Magic sized QDs are manufactured such that all QDs in a particular batch have exactly the same size. These identically-sized quantum dots are termed "Magic Sized" (MS), exhibiting single dot optical properties. The second ensemble, tuned to not change in optical density as a result of ionizing radiation, was comprised of regular QDs having CdSe cores. QDs were exposed to Cs-137 gamma radiation (662 keV). Results shown in FIG. 6.

Example 5

Evolution of Response After Irradiation

Figure 7:
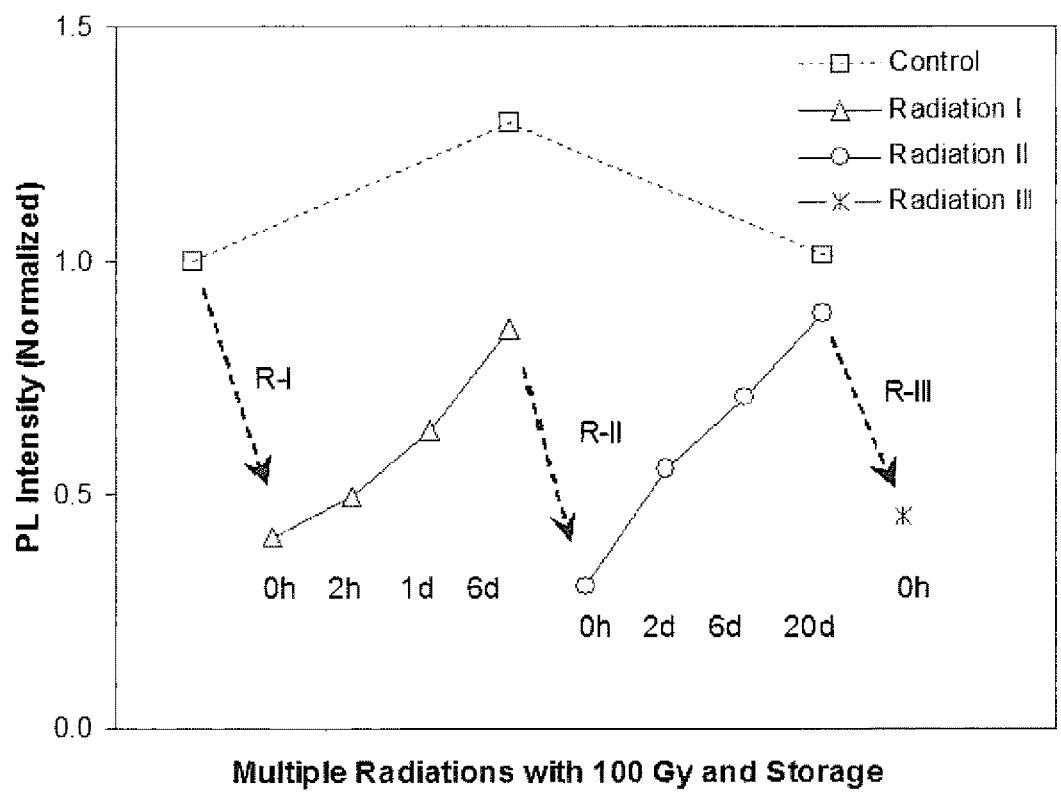
FIG. 7: The figure shows evolution of core Cd/Se QD fluorescence during three successive irradiations (R-I, R-II, R-III) and control (without irradiation) (from hours to days). The y-axis is total measured photoluminescence. This suggests that QDs may have repeated-use capabilities.
Figure 8:
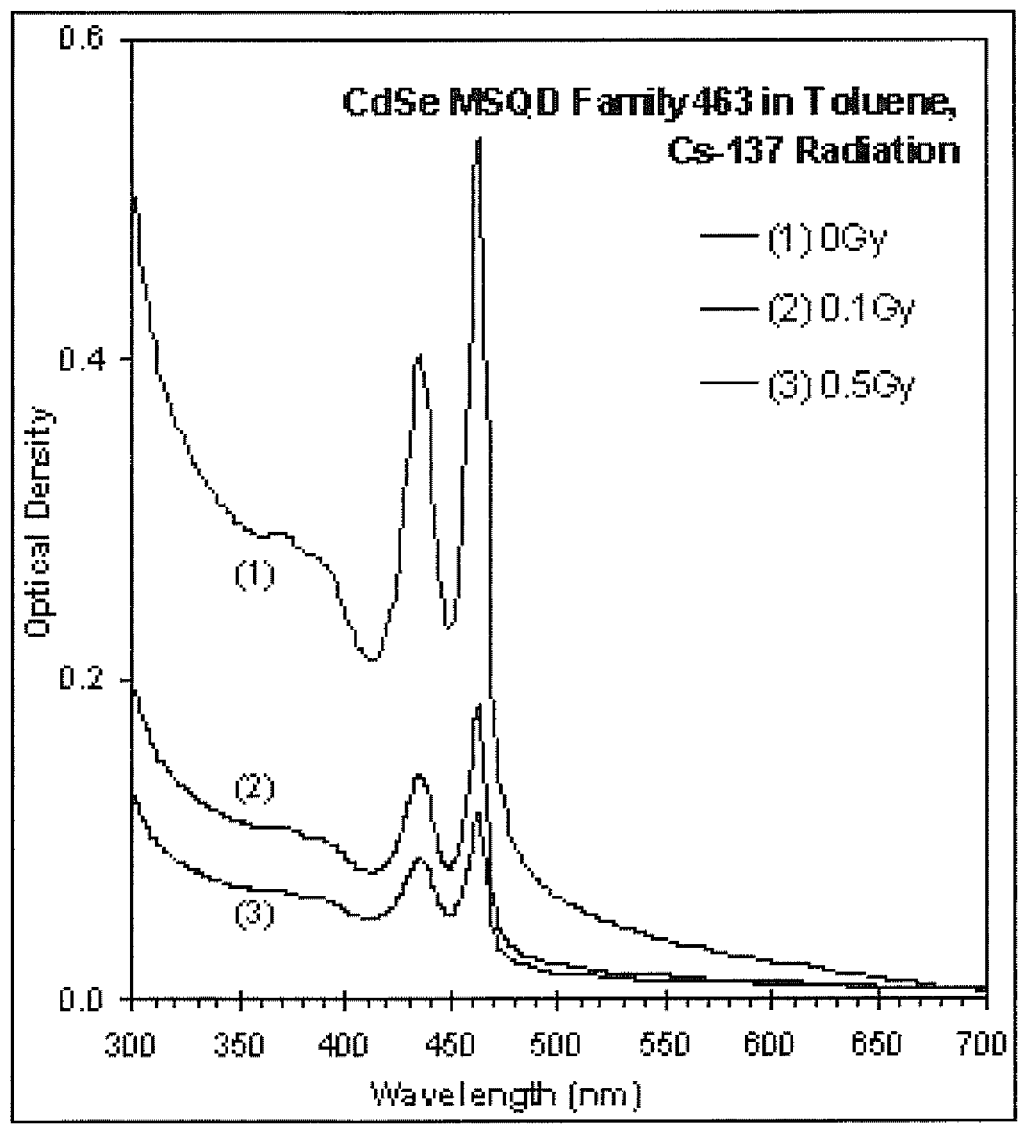
FIG. 8: Left: The figure shows evolution of optical density spectra for "Magic-Sized" CdSe MSQDs in toluene before irradiation (0 Gy), and following exposures to 0.1 and 0.5 Gy ionizing radiation. Right: The figure shows evolution of photoluminescence spectra for "Magic-Sized" CdSe MSQDs in toluene using 430 nm excitation wavelength before irradiation (0 Gy), and following exposures to 0.1 and 0.5 Gy ionizing radiation.
Figure 8:
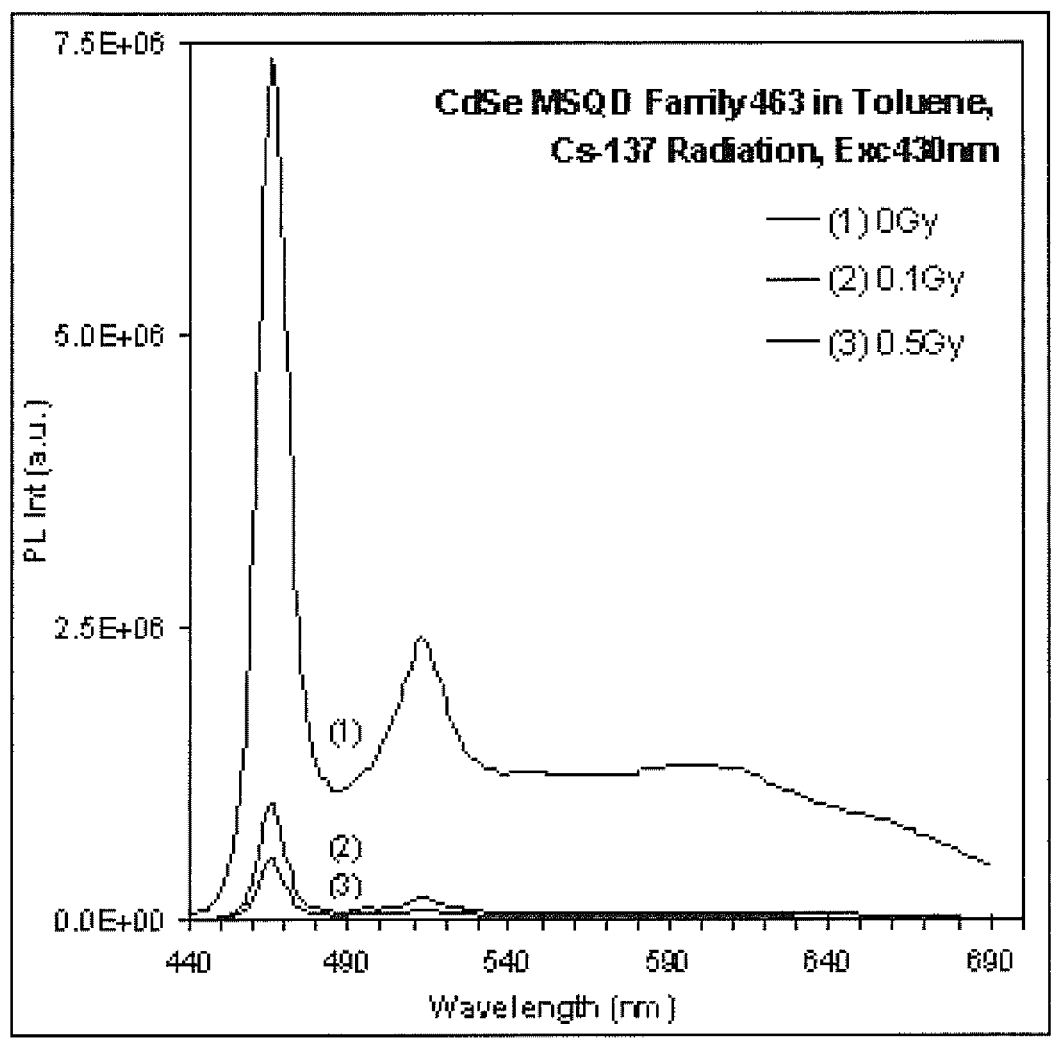
Figure 9:
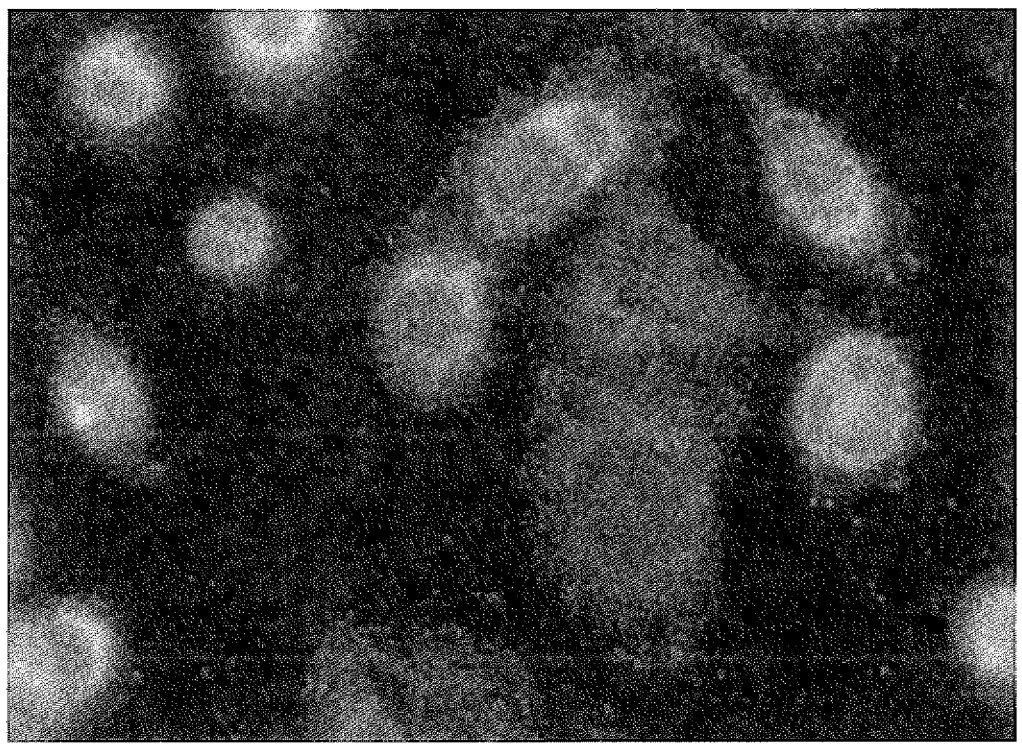
FIG. 9: The figure shows a micrographic image of quantum dots labeling cells. The image was acquired using a fluorescence microscope. The cells (and their supporting growth medium) form the matrix in one embodiment of the present invention. Radionuclides (such as P-32) would then be introduced, and the quantum dots would be imaged repeatedly to monitor changes in fluorescence over time. From that series of images, dose received by each quantum dot would be calculated (source: Yu et al, "single-domain antibody functionalized CdSe/ZnS quantum dots for cellular imaging of cancer cells", *J. Phys. Chem C*, 2009, in press).

QDs can be made to have a photoluminescent profile that evolves after termination of an irradiation. In the example below, regular CdSe QDs were irradiated by Cs-137 to 100Gy, and then photoluminescence was measured repeatedly over a period of time. Then, the irradiation was repeated and additional photoluminescent measurements were taken with the results shown in FIG. 7.

All references cited herein are incorporated herein by reference in their entirety and for all purposes to the same extent as if each individual reference was specifically and individually indicated to be incorporated by reference in its entirety for all purposes. Citation of a reference is not to be construed as an admission that the reference is available as prior art against the present application. It is also noted that the Drawings are not to scale.

Although preferred embodiments of the invention have been described herein in detail, it will be understood by those skilled in the art that variations may be made thereto without departing from the spirit of the invention or the scope of the appended claims.

We claim:

1. A system for detection of doses of ionizing radiation, said system comprising:
   (a) a matrix comprising photoluminescent semiconductor nanocrystals;
   (b) an illumination interface for exposing said matrix to non-ionizing radiation;
   (c) a response characterization interface for measuring photoluminescence, scatter, or optical density of said matrix and identifying changes in said photoluminescence, scatter, or optical density caused by exposure to ionizing radiation; and
   (d) a readout interface to quantify said changes in said photoluminescence, scatter, or optical density as a dose of radiation, wherein said changes in said photoluminescence, scatter, or optical density are selected from the group consisting of an increase or decrease in photoluminescence, scatter, or optical density, respectively, of any feature of a respective photoluminescence, scatter, or optical density spectrum and a frequency shift of any spectral feature of a respective photoluminescence, scatter or optical density spectrum.

2. The system of claim 1, wherein said changes in said photoluminescence, scatter, or optical density vary with time elapsed after exposure of said matrix to said ionizing radiation.

3. The system of claim 1, wherein said changes in said photoluminescence, scatter or optical density are determined during said exposure to ionizing radiation, after said exposure, or both during and after said exposure.

4. The system of claim 1, wherein said readout interface further quantifies said changes in said photoluminescence, scatter, or optical density as an amount of time elapsed after said exposure.

5. The system of claim 1, wherein said nanocrystals are selected from a homogenous ensemble and a heterogeneous ensemble.

6. The system of claim 1, wherein said matrix comprises cells, said system being usable for cellular dosimetry.

7. The system of claim 6, wherein said ionizing radiation originates from inside one or more cells.

8. The system of claim 6, wherein said nanocrystals preferentially adhere to an outer surface of at least one of said cells.

9. The system of claim 6, wherein said nanocrystals are conjugated with a member selected from the group consisting of an antibody that targets said preferentially adheres to a specific organelle inside at least one of said cells and a nucleotide that targets and preferentially adheres to DNA or RNA inside at least one of said cells.

10. The system of claim 9, wherein any of said nanocrystals and said antibody is labeled with radioactivity or any of said nanocrystals and said nucleotide is labeled with radioactivity.

11. The system of claim 9, wherein said nanocrystals are modified to be water soluble.

12. The system of claim 11, wherein said nanocrystals are modified with Cucurbituril.

13. A method for detection and/or quantification of ionizing radiation dosages, the method comprising:
   (a) exposing photoluminescent semiconductor nanocrystals to non-ionizing radiation to provide a first photoluminescence, scatter, or optical density measurement;
   (b) exposing said nanocrystals to ionizing radiation;
   (c) exposing said nanocrystals to non-ionizing radiation again to provide a second photoluminescence, scatter or optical density measurement;
   (d) comparing the second measurement to the first measurement; and
   (e) interpreting the difference as dose.

14. The method of claim 13, further comprising displaying said dose to a user.

15. The method of claim 13 wherein said difference is selected from the group consisting of an increase or decrease in photoluminescence, scatter, or optical density, of any feature of a respective photoluminescence, scatter, or optical density spectrum and a frequency shift of any spectral feature of a photoluminescence, scatter, or optical density spectrum.

16. The method of claim 13, wherein said difference varies with time elapsed after said exposing said nanocrystals to ionizing radiation.

17. The method of claim 13, wherein said second measurement is carried out during said exposing to ionizing radiation, after said exposing to ionizing radiation, or both during and after said exposing to ionizing radiation.

18. The method of claim 13, wherein said first measurement is carried out prior to said exposing to ionizing radiation, said first measurement providing a baseline spectrum.

19. The method of claim 13, further comprising interpreting said difference as an amount of time elapsed after said exposing to ionizing radiation.

20. The method of claim 13, wherein said nanocrystals are selected from a homogeneous ensemble and a heterogeneous ensemble.

21. The method of claim 13, wherein said second measurement is carried out remotely and outside of a radiation field used for said exposing to ionizing radiation.

22. The method of claim 13, wherein said nanocrystals are comprised within cells, said method being usable for cellular dosimetry.

23. The method of claim 22, wherein said ionizing radiation originates from outside of said cells or from inside of said cells.

24. The method of claim 22, wherein said nanocrystals preferentially adhere to an outer surface of at least one of said cells.

25. The method of claim 22, wherein said nanocyrstals are conjugated with a member selected from the group consisting of an antibody that targets and preferentially adheres to a specific organelle inside at least one of said cells and a nucleotide that targets and preferentially adheres to DNA or RNA inside at least one of said cells.

26. The method of claim 25, wherein any of said nanocrystals and said antibody or any of said nanocrystals and said nucleotide is labeled with radioactivity.

27. The method of claim 13, wherein said nanocrystals are modified to be water soluble.

28. The method of claim 27, wherein said nanocrystals are modified with Cucurbituril.

29. An ionizing radiation dosimeter comprising:
(a) a substrate; and
(b) a matrix comprising photoluminescent semiconductor nanocrystals deposed as a layer on said substrate, the nanocrystals having a known photoluminescence, scatter, or optical density spectral response varying in accordance with a dose of ionizing radiation,
wherein said matrix comprises cells, said dosimeter being usable for cellular dosimetry,
further wherein said ionizing radiation originates from outside of said matrix, from inside of said matrix, or from inside one or more cells,
wherein said nanocrystals are conjugated with a member selected from the group consisting of an antibody that targets and preferentially adheres to a specific organelle inside at least one of said cells and a nucleotide that targets and preferentially adheres to DNA or RNA inside at least one of said cells, and further wherein said nanocrystals preferentially adhere to an outer surface of at least one of said cells.

30. The dosimeter of claim 29, wherein any of said nanocrystals and said antibody or any of said nanocrystals and said nucleotides is labeled with radioactivity.

31. The dosimeter of claim 29, wherein said nanocrystals are modified with Cucurbituril to be water soluble.

* * * * *